US 6,462,554 B2

(12) United States Patent
Brown

(10) Patent No.: US 6,462,554 B2
(45) Date of Patent: *Oct. 8, 2002

(54) SYSTEM AND METHOD FOR DETERRING OPERATION OF A SYSTEM OUTSIDE A SPECIFIED FREQUENCY RANGE

(75) Inventor: David A. Brown, San Jose, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/504,370

(22) Filed: Feb. 15, 2000

(65) Prior Publication Data

US 2002/0050825 A1 May 2, 2002

(51) Int. Cl.$^7$ .................. G01R 31/00; G01R 31/36; H02H 3/20
(52) U.S. Cl. .................. 324/500; 324/771; 361/91.1
(58) Field of Search ................ 324/500, 771, 324/702, 76.11, 76.12, 76.39; 327/49; 323/318; 713/501, 324; 714/22, 14; 361/91.1, 86

(56) References Cited

U.S. PATENT DOCUMENTS

| 4,999,730 A | * | 3/1991 | Pickard .................. 361/90 |
| 5,122,646 A | | 6/1992 | Taeymans, Jr. et al. ...... 235/482 |
| 5,274,337 A | | 12/1993 | Young et al. ............... 328/138 |
| 5,280,605 A | | 1/1994 | Young et al. ............... 395/550 |
| 5,510,720 A | | 4/1996 | Vauclin .................... 324/652 |
| 5,592,111 A | * | 1/1997 | Wong et al. ................ 327/45 |

* cited by examiner

Primary Examiner—N. Le
Assistant Examiner—James C Kerveros
(74) Attorney, Agent, or Firm—Schwegman, Lundberg, Woessner & Kluth, P.A.

(57) ABSTRACT

A system and method for detecting the operation of an electronic device at a frequency that is outside a tested or warranted frequency range. An overvoltage detection device senses an operating voltage. When the sensed voltage exceeds a predetermined voltage level an overvoltage detection signal is generated. The overvoltage detection signal is coupled to an electronic device in which the operating frequency is related to the operating voltage. On receiving the overvoltage detection signal indicating out of warranty operation, the electronic device switches among a number of operating modes to deter the out of warranty operation.

26 Claims, 3 Drawing Sheets

US 6,462,554 B2

SYSTEM AND METHOD FOR DETERRING OPERATION OF A SYSTEM OUTSIDE A SPECIFIED FREQUENCY RANGE

FIELD

This invention relates to electronic systems, and more particularly to the detection of an electronic system being operated at increased voltages associated with operation outside a specified frequency range.

BACKGROUND

Some systems and circuits are designed to operate over a range of frequencies. For example, microprocessors are often designed to operate at frequencies between 200 megahertz and 500 megahertz. However, a microprocessor manufacturer may only test and warrant a microprocessor for operation at frequencies of less than 300 megahertz. To ensure that the microprocessor is not operated above the tested and warranted frequency range, the manufacturer may attempt to design circuits into the microprocessor that directly detect overfrequency operation and disable the microprocessor when the overfrequency operation is detected. Unfortunately, these circuits require at least one bulky off chip component, such as a stable frequency source, and are subject to tampering.

In general, to operate a digital system, such as a microprocessor, at a higher frequency, the power supply voltage provided to the digital system is increased. The reason for this is that the transistors that make up the logic circuits in the digital system can switch faster when operated at a higher power supply voltage level. Operating a microprocessor at a higher frequency permits the microprocessor to perform more work in a given amount of time. Since increasing the power supply voltage provided to the microprocessor improves performance, and since the cost of increasing the power supply voltage is low, some system manufacturers design systems that operate microprocessors and other digital and analog systems outside their intended and warranted frequency range by increasing the power supply voltage.

For these and other reasons there is a need for the present invention.

DESCRIPTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The present invention enables detection of operation of a system outside a particular frequency range. The frequency of operation is associated with a voltage level, and as described in greater detail below, after an overvoltage condition is detected, the system is operable for changing operating modes to discourage operation outside the particular frequency range.

Figure 1:
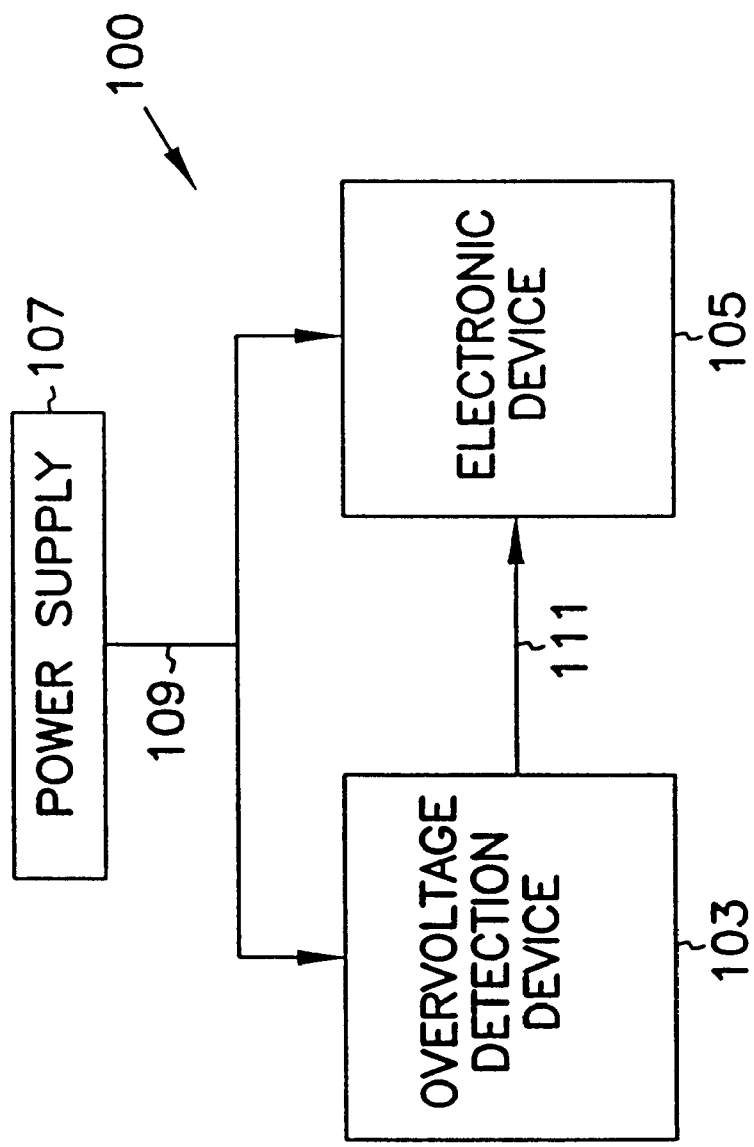
FIG. 1 is a block diagram of example embodiments of an overvoltage control system.

FIG. 1 is a block diagram of example embodiments of overvoltage control system 100. Overvoltage control system 100 includes overvoltage detection device 103, electronic device 105, and power supply 107. Power supply 107 provides power supply voltage signal 109 to overvoltage detection device 103 and to electronic device 105. Overvoltage detection device 103 generates overvoltage detection signal 111, which is coupled to an input port of electronic device 105. Overvoltage detection signal 111 is generated when power supply voltage signal 109 exceeds a predetermined value.

The packaging of overvoltage control system 100 is not limited to a single packaging scheme. In one embodiment, overvoltage detection device 103 and electronic device 105 are fabricated on the same semiconductor substrate. Alternatively, overvoltage detection device 103 is fabricated on a substrate separate from electronic device 105. The substrate is a semiconductor or other material on which integrated circuits are fabricated. Alternatively, the substrate is a ceramic substrate, such as a module substrate on which multi-chip electronic systems are packaged.

In operation, overvoltage detection device 103 compares power supply voltage signal 109 to a predetermined voltage level. In one embodiment, the predetermined voltage level is the maximum specified operating voltage of electronic device 105. If power supply voltage signal 109 exceeds the predetermined voltage level, then overvoltage detection device 103 generates overvoltage detection signal 111. Overvoltage detection signal 111 is provided to electronic device 105, which can then change operating modes. In this way, the operation of electronic device 105 is limited to operating voltage levels of power supply voltage signal 109 that are less than a predetermined value. Controls system 100, by ensuring the operation of electronic device 105 at or below a predetermined voltage level, indirectly limits the operating frequency of electronic device 105.

The present invention is not limited to use in connection with a single type of electronic device 105. The present invention is suitable for use in connection with any electronic device 105 which is capable of operating at higher performance levels by increasing a voltage level above a particular value. Electronic device 105, in one embodiment, is a digital system, such as a microprocessor having logic devices capable of operating at higher frequencies as the power supply voltage is increased. Alternatively, electronic device 105 is a base station for a wireless communication system that is capable of operating at wider distances and better range as the power supply voltage is increased.

After detecting the presence of a voltage level in a system that exceeds a predetermined value, steps are taken to disable, degrade or otherwise alter the operation of electronic device 105. For example, if electronic device 105 is a microprocessor, on receipt of overvoltage detection signal 111, the microprocessor has a variety of operating options. In one embodiment, the microprocessor displays a message that says the microprocessor is being operated at a voltage outside its operating range. Alternatively, the microprocessor reduces the operating frequency and displays a message that says the operating frequency has been reduced to a warranted or tested level. In still another alternate embodiment, the microprocessor executes a shut down procedure.

Figure 2:
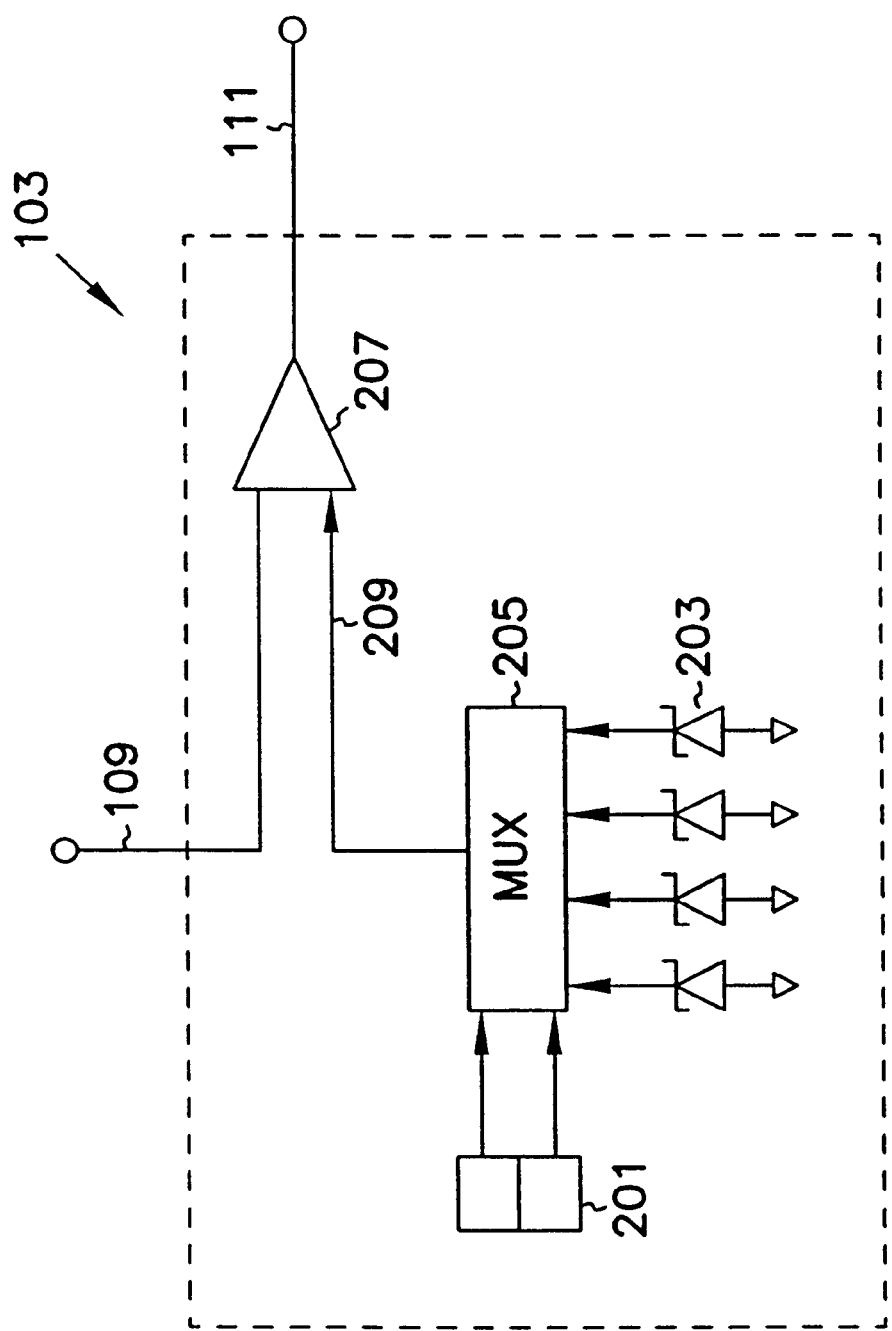
FIG. 2 is a schematic diagram of example embodiments of an overvoltage detection circuit.

FIG. 2 is a schematic diagram of an example embodiment of overvoltage detection device 103. Overvoltage detection device 103 includes a number of control devices 201, a number of voltage reference devices 203, multiplexor 205, and voltage comparator 207. The number of control devices 201 are coupled to a first input port of multiplexor 205, and the number of voltage reference devices 203 are coupled to a second input port of multiplexor 205. The first input port of multiplexor 205 controls which individual input of the second input port of multiplexor 205 is connected to multiplexor output signal 209. A first input port of comparator 207 is coupled to multiplexor output signal 209, and a second input port of comparator 207 is coupled to power supply voltage signal 109. Comparator 207 generates overvoltage detection signal 111 when power supply voltage signal 109 exceeds the value of multiplexor output signal 209.

In one embodiment of the present invention, integrated circuit manufacturing techniques are used to fabricate overvoltage detection device 103 on the same substrate as electronic device 105. Fabrication of overvoltage detection device 103 on the same substrate as electronic device 105 is an inexpensive method of manufacturing overvoltage detection device 103 and discourages tampering with overvoltage detection device 103.

The number of control devices 201 provide digital control signals to multiplexor 205. Any signal source capable of providing a logical signal level to multiplexor 205 is suitable for use in connection with the present invention. In one embodiment, the number of control devices 201 are polysilicon fuses. Polysilicon fuses are easily fabricated using integrated circuit manufacturing techniques and are also programmable after the manufacture of control system 100. The fuses are programmed by increasing the voltage coupled to the fuse above a predetermined value which blows the fuse. The number of fuses needed to control multiplexor 205 depends on the number of voltage reference devices 203 that are coupled to multiplexor 205. For example, if four voltage reference devices are coupled to multiplexor 205, then two fuses are needed to select one of the four voltage reference device outputs for routing to multiplexor output signal 209.

The number of voltage reference devices 203 provide a number of discrete voltage levels for selection and routing as multiplexor output signal 209 to comparator 207. Since the selected voltage reference signal is compared to power supply voltage signal 109 in order to determine whether power supply voltage signal 109 is within a tested or warranted range, the number of voltage reference devices 203 are selected for accuracy and stability. In one embodiment of the present invention, each of the number of voltage reference devices 203 is a zener diode. Zener diodes are easily manufactured using the same integrated circuit manufacturing processes used to fabricate electronic device 105. In addition, zener diodes are capable of providing a stable voltage reference in the voltage ranges that are commonly used to power electronic devices, such as microprocessors and other modem digital and analog systems. Finally, zener diodes provide a stable voltage level over a wide range of operating conditions and can be fabricated to operate with precision tolerances as low as 0.05%.

Multiplexor 205 is a device that controls the selection and coupling of a particular reference device to comparator 207 from among the number of voltage reference devices 209. In one embodiment, multiplexor 205 is a collection of analog switches that are capable of selecting and coupling each of the number of voltage reference devices 209 to the first input port of comparator 207. Each of the analog switches in multiplexor 205 is selected or controlled by the number of control devices 201. An input port of each analog switch is coupled to one of the voltage reference devices 209. An output port of each analog switch is coupled to the multiplexor output port. A control line for each analog switch is coupled to a digital signal derived from at least one of the number of control devices 201. When selected, an analog switch couples the output voltage of one of the voltage reference devices 203 to multiplexor output signal 209, which is coupled to the second input port of comparator 207. In one embodiment, each of the analog switches is a metal oxide semiconductor field-effect transistor (MOSFET) configured to function as an analog switch.

Comparator 207 compares multiplexor output signal 209 to power supply voltage signal 109 to determine whether the value of power supply voltage signal 109 exceeds the value of multiplexor output signal 209. The comparison being performed is between two direct current voltage signals. Power supply signal 109 may include several millivolts of random noise and logic switching induced noise spikes of short duration. Comparator 207 need not be a high speed or high performance device, but should have sufficient hysteresis to avoid noise induced oscillations. Comparator 207, in one embodiment, is a high gain differential amplifier, such as an operational amplifier, configured as a comparator. Alternatively, comparator 207 is a simple differential amplifier. The output of comparator 207 is coupled to electronic device 105, so the output signal levels of comparator 107 should be compatible with the input ports of electronic device 105.

Figure 3:
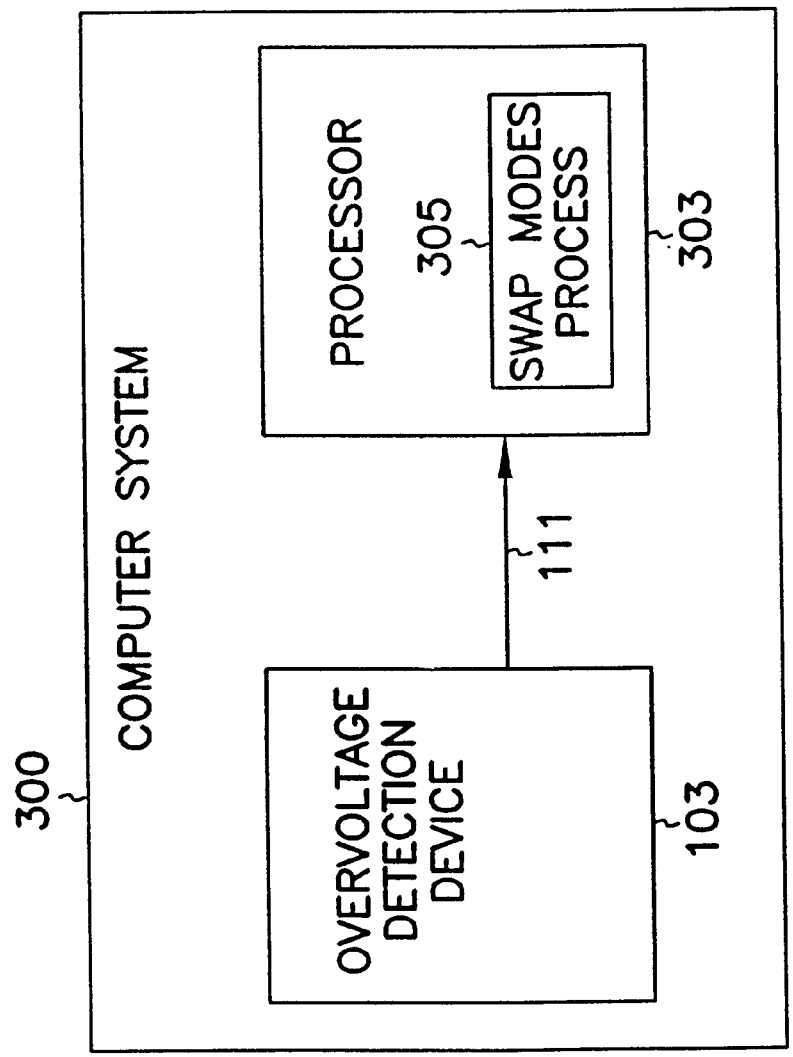
FIG. 3 is a schematic diagram of example embodiments of a computer system including an overvoltage control system.

Overvoltage detection device 103 shown in FIG. 2 is useful for detecting out of frequency operation in a computer system. FIG. 3 is a block diagram of example embodiments of computer system 300 including overvoltage detection device 103 coupled to processor 303. Computer system 300 is not limited to a particular type of computer system. Computer system 300 includes networked systems, systems including peripheral devices, such as disk drives and monitors, and software systems, such as operating system processes and application programs. The detailed operation of overvoltage detection device 103 is described above. When overvoltage detection device 103 detects an overvoltage condition in processor 303, overvoltage detection signal 111 is provided to processor 303, and processor 303 executes mode swapping process 305. Mode swapping process 305 is operable for changing the mode of operation of processor 303. For example, mode swapping process 305 can power down processor 303, change the frequency of operation of processor 303, or display a message indicating that processor 303 is being operated outside a warranted or tested parameter of operation.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A system comprising:
   an overvoltage detection device operable to sense a voltage and to generate an overvoltage detection signal when the voltage exceeds a predetermined value; and an electronic device having an operating frequency that is related to the voltage, the electronic device being operable to directly receive the overvoltage detection signal and to switch among a number of operating modes in response to the overvoltage detection signal.

2. The system of claim 1, wherein the operating frequency exceeds a particular frequency.

3. The system of claim 2, wherein the particular frequency is a warranted frequency.

4. The system of claim 1, further comprising:

a substrate on which the overvoltage detection device and the electronic device are fabricated.

5. The system of claim 4, further comprising:

a number of fuses fabricated on the substrate and operable for selecting a voltage level at which the overvoltage detection signal is activated.

6. The system of claim 5, wherein at least one of the number of fuses is blown after the fabrication of the electronic device.

7. The system of claim 1, wherein the electronic device comprises:

a communications device.

8. The system of claim 1, wherein the electronic device comprises:

a processor.

9. The system of claim 1, wherein the electronic device comprises:

a processor embedded in a communications device.

10. The system of claim 1, wherein the overvoltage detection device comprises:

a number of control devices;

a number of voltage reference devices;

a multiplexor coupled to at least one of the number of control devices and at least one of the number of voltage reference devices, the multiplexor having a multiplexor output port; and a comparator coupled to the multiplexor output port and to the voltage, the comparator operable for generating the overvoltage detection signal when the voltage exceeds a predetermined voltage.

11. The system of claim 10, wherein the number of control devices comprises:

a number of fuses.

12. The system of claim 10, wherein the number of voltage references devices comprises:

a number of zener diodes.

13. A method comprising:

generating an overvoltage signal when an operating voltage of an electronic device exceeds a particular voltage level;

detecting the overvoltage signal at the electronic device; and changing operating modes of the electronic device, without reducing the operating voltage to zero, when the overvoltage signal is detected.

14. A method comprising:

generating an overvoltage signal when an operating voltage of an electronic device exceeds a particular voltage level;

detecting the overvoltage signal at the electronic device; and changing operating modes of the electronic device when the overvoltage signal is detected, wherein changing operating modes of the electronic device when the overvoltage signal is detected comprises reducing the operating frequency of the electronic device, but not reducing the operating frequency of the electronic device to zero.

15. The method of claim 13, wherein changing operating modes of the electronic device when the overvoltage signal is detected comprises:

powering down the electronic device.

16. A circuit comprising:

a comparator;

a supply voltage coupled to the comparator; and a selectable voltage reference coupled to the comparator, the comparator being operable for generating an overvoltage signal when the supply voltage exceeds the selectable voltage reference.

17. The circuit of claim 16, wherein the selectable voltage reference is coupled to the comparator through a multiplexor.

18. The method of claim 17, wherein the multiplexor has a control input coupled to a fuse.

19. A computer system comprising:

an overvoltage detection circuit capable of generating an overvoltage signal; and a processor coupled to the overvoltage detection circuit and operable to power down the processor when an overvoltage voltage signal is detected.

20. The computer system of claim 19, wherein the overvoltage detection circuit is programmed after the processor is manufactured.

21. A system comprising:

an overvoltage detection device operable to sense a voltage and to generate an overvoltage detection signal when the voltage exceeds a predetermined value; and an electronic device having an operating frequency, the electronic device being operable to receive the overvoltage detection signal and to reduce the operating frequency to a non-zero frequency in response to the overvoltage detection signal when the operating frequency exceeds a particular frequency for which the electronic device is warranted.

22. The system of claim 21, further comprising:

a single semiconductor substrate on which the overvoltage detection device and the electronic device are fabricated.

23. The system of claim 22, further comprising:

a number of fuses fabricated on the single semiconductor substrate and operable for selecting a voltage level at which the overvoltage detection signal is activated.

24. The system of claim 23, wherein the overvoltage detection device comprises:

a number of control devices;

a number of voltage reference devices;

a multiplexor coupled to at least one of the number of control devices and at least one of the number of voltage reference devices, the multiplexor having a multiplexor output port; and a comparator coupled to the multiplexor output port and to the voltage, the comparator operable for generating the overvoltage detection signal when the voltage exceeds a predetermined voltage.

25. The system of claim 24, wherein the number of control devices comprises:

a number of fuses.

26. The system of claim 25, wherein the number of voltage references devices comprises:

a number of zener diodes.

* * * * *

UNITED STATES PATENT AND TRADEMARK OFFICE
CERTIFICATE OF CORRECTION

PATENT NO. : 6,462,554 B2
DATED : October 8, 2002
INVENTOR(S) : David A. Brown

It is certified that error appears in the above-identified patent and that said Letters Patent is hereby corrected as shown below:

<u>Title page,</u>
Item [56], U.S. PATENT DOCUMENTS, delete "Jr." after "Taeymans".

Signed and Sealed this

Eighteenth Day of March, 2003

JAMES E. ROGAN
*Director of the United States Patent and Trademark Office*